United States Patent [19]

Countryman

[11] 3,823,502

[45] July 16, 1974

[54] REEL ASSEMBLY

[75] Inventor: James H. Countryman, Dayton, Ohio

[73] Assignee: Roger S. Dybvig, Dayton, Ohio

[22] Filed: June 22, 1971

[21] Appl. No.: 155,419

[52] U.S. Cl.................... 43/20, 242/84.2 J, 242/96
[51] Int. Cl............................................. A01k 89/00
[58] Field of Search ...... 242/84.2 R, 84.2 B, 84.2 J, 242/85.1, 96, 84.21 W; 46/59; 43/20

[56] References Cited
UNITED STATES PATENTS

| 744,454 | 11/1903 | Allen | 242/84.2 B |
| 1,621,003 | 3/1927 | Dodd | 242/84.2 B UX |
| 2,677,509 | 5/1954 | Gage | 242/84.2 B |
| 3,033,060 | 5/1962 | Nemec | 242/84.21 W X |
| 3,272,448 | 9/1966 | Caravella | 242/55.2 |

Primary Examiner—Billy S. Taylor
Attorney, Agent, or Firm—Dybvig & Dybvig

[57] ABSTRACT

Line is wound onto a spool rotated by twirling the spool. Three models of a small hand held fishing device are illustrated utilizing a twirling spool with which the fishing line may be cast with a slinging motion. The spools are connected to handles by flexible connectors permitting the line to be cast in spin cast fashion with the axis of the spool pointing generally toward the direction of the cast. Preparatory to reeling the line in, the spools are moved to positions at an angle to the casting positions before the spools are twirled. Two of the illustrated models are designed to permit the spools to be rotated about their axes instead of twirled. Accordingly, the line can also be reeled in by using the spools as winding drums. In one of these two models, the spool is directly manipulated by the user and pivoted to the reeling position at which it is held by means of a shell-like holder and line guide. In the other of these two models, the spool is remotely engaged by a lever operator and it may be held in its reeling position by engagement of portions of the lever with the shell. The third illustrated model has an annular raceway fixed in relation to the handle against which the spool tracks when the line is reeled in.

20 Claims, 12 Drawing Figures

INVENTOR
JAMES H. COUNTRYMAN

INVENTOR
JAMES H. COUNTRYMAN
BY
*Dybvig and Dybvig*
ATTORNEYS

REEL ASSEMBLY

BACKGROUND OF THE INVENTION

This invention relates to a reel assembly capable of general use and especially adapted for use as a fishing line reel and this invention also relates to small hand fishing devices utilizing such a reel assembly.

Numerous types of reeling devices are in use and most of the various types have been suggested for or adapted to fishing equipment. Thus, there is the well known drum type fishing reel in which the line is wound onto a rotating drum, the spinning reel in which the line uncoils over the end of a spool, a combination spin cast and drum wind type in which the line is cast out in spin cast fashion and reeled in by rotating the axis of the spool through 90° and then rotating the spool about its axis, flier type winders in which during the reeling of the line the spool remains stationary and the line is guided onto the spool by a rotating wire guide or flier. Examples of combined spinning and drum reels are shown in U.S. Pat. Nos; to Teitsma, 2,283,773; and Redding, 2,613,046. A type of flier winder is shown in Kaiser U.S. Pat. No. 2,772,505.

The spin cast type of fishing reel is generally considered to be the best all around casting device because the line simply uncoils from the spool with very little friction. Since the spool does not rotate when casting, backlash is practically non-existent and the reel is quite easy to use. Complications are encountered, however, when reeling the line in because the line obviously cannot be "spun" wound and rather complicated mechanisms have been developed for this purpose. The combination spin cast and drum wind reels only partially solve the problem and have the drawback that, since the line is reeled in in a different manner from which it is cast out, the twist imparted to the line as it is cast is not removed when it is wound in. The twisting of the line is additive with successive casts so that, in a comparatively short time, the line is so hopelessly twisted that it may break or snarl. This problem has led to various suggested solutions, one proposal being described in the aforementioned Teitsma Pat. No. 2,283,773.

Spin cast reels or the combination spin cast and drum wind reels have been used in small hand held fishing devices which do not rely upon the originary long flexible fishing pole. Instead, the line is cast out with a slinging motion. Examples of such devices are shown in Allen Pat. Nos. 2,434,479 and 2,537,613, Reid No. 2,684,550, Marconi No. 3,010,673 and Ehlert No. 3,179,351.

The small hand held fishing devices have met with only limited success, such as their inclusion in survival kits. It is believed that these devices have not been successful because they are cumbersome to operate when reeling the line in. The devices shown in some of the foregoing patents have no reeling in mechanism and, accordingly, the line is simply wound onto the spool by hand. Others such as the devices described in the aforementioned Allen patents are short, compact forms of the combination spin cast and drum wind reels mentioned above, and thus suffer generally from the drawbacks of such reels. Also, they require the fisherman to hold the device in one hand while cranking to wind in with the other.

SUMMARY OF THE INVENTION

This invention represents a distinct departure from conventional line reeling devices. An object of this invention is to provide a reel assembly which, in contrast to more conventional reels, has no flier and need not have a spool which rotates about its own axis when reeling line. Instead the spool is twirled in a cranking fashion causing orbital movement of the spool relative to the general longitudinal axis of the line so that the line is wrapped or curled onto the spool. Although the invention is described herein in connection with fishing devices, it is believed that the invention will have applications in other technical fields since, as will be discussed below, there are inherent advantages in the type of reeling action provided by this invention.

A further object of this invention is to provide an inexpensive, simple casting and reeling fishing device in which the line is cast out in a spin cast fashion and reeled in by the aforementioned twirling motion of a spool. The effect of the twirling motion is to cause the line to be curled or coiled around the spool in substantially the same way that the coils of the line are cast out. Accordingly, and in contrast to the combined spin cast-drum wind type reels, the problem of twisting of the line is minimized because the turns or coils of the line on the reel remain substantially constant even after repeated casts.

The reel of this invention could be used with substantially conventional fishing poles. However, a further object of this invention is to provide an improved, inexpensive and novel, small hand held fishing device utilizing the twirling spool principle described above and one which enhances the enjoyment of fishing. The device includes a handle and a spool connected to the handle by means permitting an orbital motion of the spool about the longitudinal axis of the handle. The device is inherently inexpensive because it is made from a minimal number of parts. The body movements required to operate it are simple to learn. However, with practice, one acquires greater skill in its use. Partly because of the novel operation of the device and the skill and body movements involved in its use, the enjoyment of fishing is enhanced. As is the case with conventional fishing rods and reels, added enjoyment may be had through competition with others.

Although mechanical devices such as cranks could be used to drive the spool during its orbital motion, in the preferred embodiments of this invention the handle is twirled through wrist motion, the momentum of the spool aiding in continuing the twirling motion, whereupon the line is rapidly reeled in simply by rotating or cranking motion of the wrist.

Also in the preferred embodiments the spool is connected to the handle by connecting means including a coil spring which acts both as a flexible connector and as a rotary drive as well as a means for biasing the spool to a spin casting position. A coil spring spirally and tightly wound with the turns of the spring normally engaged along their entire circumference is preferred, a tightly coiled spring tending to be self-damping so that when it moves to its spin cast position it will reliably stop at that position.

Although it will become apparent that the centrifugal forces acting on the spool as it is being orbited will tend to cause it to remain in the reeling position, preferably some means are provided for releasably holding the spool in the reeling position. In the preferred embodiments the spool is releasably held in the reeling position by engagement with a shell or cowling which also acts as a guide for the fishing line. The shell or cowling may be caused to spin about the axis of the handle along with the spool whereupon the weight of the shell contributes to the orbital drive of the spool Alternatively, the spool may ride along a trackway formed on the shell or cowling.

Other objects and advantages will become apparent from the following description and the drawings.

DESCRIPTION OF THE PREFERRED EMBODIMENTS

Referring to FIGS. 1–4, a fishing device in accordance with this invention is generally designated 10. The fishing device 10 includes a spool support comprising an elongate, generally cylindrical handle 12, a spool 14 and means for mounting the spool 14 on the handle 12 comprising a flexible connector in the form of a tightly coiled spring 16 having one end coaxial with the spool 14 and its other end coaxial with the longitudinal axis of the handle 12. The spring 16 has a normal, relaxed condition illustrated by dot-dash lines 16a with its axis straight and aligned with the longitudinal axis of the handle 12. A thin walled shell or cowl member 18 is mounted on the handle 12 for rotation about its axis. A portion, designated 20, of the shell or cowl 18 is cut away so that one gripping the handle 12 may reach through the portion 20 with the thumb to engage the spool 14. The edge of the opening 20 most remote from the handle 12 is notched as illustrated at 22 for receiving the end of a pin 24 which projects beyond the free end of the spool 14. The end of the shell 18 farthest from the handle 12 is formed with a relatively large bore 26 adapted to guide the fishing line and, intermediate the bore 26 in the handle 12, the shell 18 is provided with a depending plate portion 28 having a smaller wire guide aperture 30 extending therethrough.

Figures 2, 3, 4:
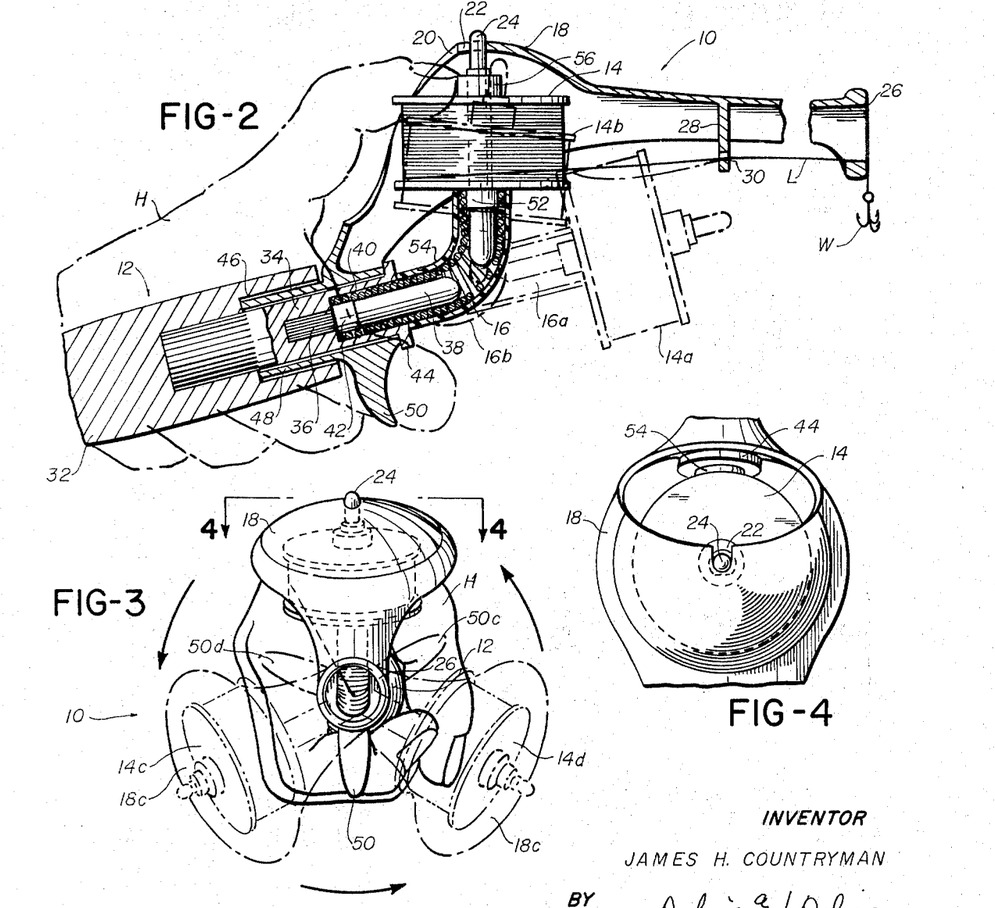
FIG. 2 is a longitudinal cross sectional view of the device of FIG. 1 and showing by dot-dash lines the manner in which the reel moves from a reeling in position to a casting position and also showing by dot-dash lines the hand of a user gripping the device.
FIG. 3 is a front elevational view of the fishing device of FIGS. 1 and 2 shown gripped by the hand of a user during the reeling in of line and also showing by dot-dash lines the manner in which the reel assembly is orbited about the axis of the handle.
FIG. 4 is a plan view of a portion of the device of FIGS. 1 to 3 as viewed in the direction of arrows 4—4 of FIG. 3.

The handle 12 could be made in various ways. As illustrated, it may consist of three parts, a solid hand grip portion 32 having a bore at one end into which a bearing portion 34 is press fit. The bearing portion 34 is an essentially solid cylindrical member projecting beyond the end of the hand grip portion 32 is itself bored for receiving a splined end 36 of a guide and connector pin 38. The free end of the bearing portion 34 is counterbored at 40 and the end of the spring 16 adjacent the handle 12 is received within the counterbore 40 in surrounding relation to the pin 38. A portion 42 of the pin 38 immediately adjacent the base of the counterbore 40 is enlarged and the bitter end of the spring 16 is press fit thereon for rotation therewith. The outermost end of the bearing member 34 is provided with an annular flange 44, the rear face of which is in confronting relation to the base of a counterbore 46 in the hand grip portion 32 receiving the bearing member 34.

The shell 18 includes a tubular sleeve portion 48 journalled for rotation on the bearing member 34 and confined between the base of the counterbore 46 and the flange 44. Extending on the opposite side of the sleeve portion 48 from the cutout portion 20 of the shell 18 is a tang 50 which cooperates with the handle 12 to provide a type of pistol grip for use when casting as will be described below.

The lower end of the pin 24, which extends coaxially with the center axis of the spool 14, is enlarged at 52 to press fittingly receive the bitter end of the spring 16 adjacent the spool 14. Here it may be noted that the ends of the spring 16 can, if desired, be permanently affixed as by welding or soldering to the enlarged pin portions 42 and 52. The mutually adjacent portions of the pins 24 and 38 substantially fill the inside of the spring 16 and their confronting ends are bullet-nosed with radii approximately the same as the larger inside radius of the spring 16 when the spring 16 is bent to the position shown in full lines in FIG. 2. The pins 24 and 38 are designed to maintain the ends of the spring 16 aligned in the same plane. The portion of the spring 16 between the flange portion 44 and the base of the spool 14 may optionally be coated or covered by a flexible and resilient plastic or the like sheath 54.

The spool 14 may be entirely conventional and it can be affixed to the pin 24 or, alternatively, it may be rotatably mounted on the pin 24 and fastened thereto such as by a nut 56. As will be understood by those familiar with the art, a clutch arrangement, not shown, may be provided between the pin 24 and portions of the spool 14 permitting the portions of the spool 14 to rotate relative to the pin 24 should there be a sudden jerk or pull on the line (designated L). Commercially available spools are so designed that the resistance or drag of such a clutch may be preadjusted by tightening or loosening of the nut 56.

Figure 1:
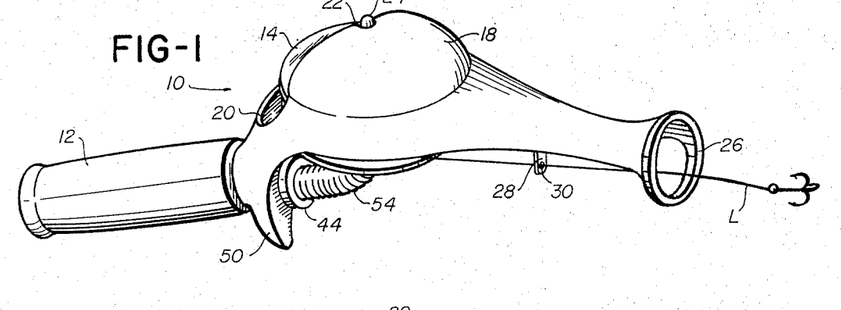
FIG. 1 is a perspective view of one embodiment of a fishing device employing a reel made in accordance with this invention.

In FIGS. 1 and 2 the device is shown with parts as they are located during the reeling in of the line. Here it will be noted that the center axis of the spool 14 intersects the longitudinal axis of the handle 12 at an angle roughly on the order of 60° to 90°. In FIG. 2 dot-dash lines 14a illustrate the position of the spool 14 when casting. Other dot-dash lines 14b and 16b illustrate the position of these parts in preparation for casting and the hand H of a fisherman is shown in the position it would occupy in preparation for casting. The operation of the device 10 is as follows. Starting with the parts located as shown in full lines in FIG. 2, the spool 14 is engaged by the thumb and moved downwardly and forwardly into the position of the spool shown at 14b. This movement of the spool is accompanied by a removal of the pin 24 from engagement in the notch 22 in the shell 18. The device 10 is then swung through an arc such as one would follow when pitching a soft ball underhanded whereupon the fish hook, designated W, which in practice would have a weight associated with it, acquires energy through centrifugal force. During this swinging movement the spool 14 is held by the thumb in the position illustrated by lines 14b so that none of the line L is removed from the spool 14. The entire device 10 can be firmly gripped during this interval by wrapping the palm about the handle 12 and engaging the index finger over the tang 50. At the desired moment, the fisherman releases his thumb hold on the spool 14 whereupon it is moved by the spring 16 to the position illustrated by the lines 14a with the center axis of the spool 14 aligned with the longitudinal axis of the handle 12 at which time the fish hook W is slung or cast out over the water with the line L unwinding over the end of the spool 14. As with other spin casting devices, the device 10 is pointed generally in the direction of the cast. With practice, one learns to cast out as far as desired.

After the line L is cast, the spool 14 is manually moved back to the position shown in full lines in FIG. 2 with the axis of the spool 14 intersecting the axis of the handle 12 and with the pin 24 again engaged in the notch 22. When it is desired to reel the line in, the hand H is moved into the position shown in full lines in FIG. 3, wrapped about the handle 12 and completely disengaged from the shell 18 and its tang 50. The device 10 is then swung by a type of cranking motion through an arc which, generally, encircles the longitudinal axis of the portion of the line L beyond the end of the device 10, whereupon the off center weight of the spool 14 and the shell 18 causes those parts to rotate about the longitudinal axis of the handle 12. Such rotation is possible because of the flexible coupling between the handle 12 and the spool 14 provided by the spring 16. In effect one turn of the spring 16 continuously pivots or tilts about an adjacent turn of the spring 16. As a consequence of the orbital rotation of the spool 14 about the longitudinal axis of the handle 12, the line L is caused to be wrapped or curled about the spool 14. After the orbital movement of the spool 14 is initiated through the cranking movement of the handle 12, it gathers momentum and only a small wrist-twisting movement is required to keep the spool 14 orbiting until the desired length of line is reeled in.

Figure 5A:
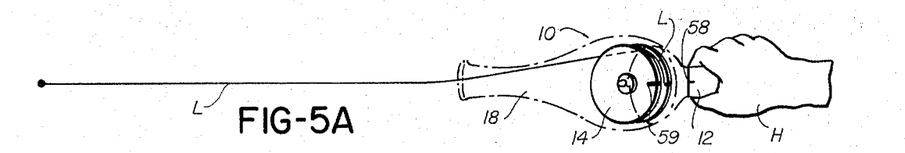
FIGS. 5A, 5B, 5C and 5D diagrammatically illustrate successive positions of the parts and the line being reeled in during 180° orbital movement of the spool.

FIGS. 3 and 5A, 5B, 5C and 5D illustrate the orbital movement of the spool 14 and the type of reeling action involved in the use of the device 10. In these figures the movement of the spool 14 and the shell 18 relative to the handle 12 is illustrated. The movement of the handle 12 itself is not illustrated. FIG. 5A shows, in plan, a starting point for rotation, the same starting point also being shown in full lines in FIG. 3. Here it will be observed that the device 10 is generally pointed along the longitudinal axis of the line L and, because the spool 14 has been positioned with its axis intersecting the axis of the handle 12, its axis is nearly perpendicular to the longitudinal axis of the line L and the line L engages the spool 14 at a point tangent to the spool.

Figure 5B:
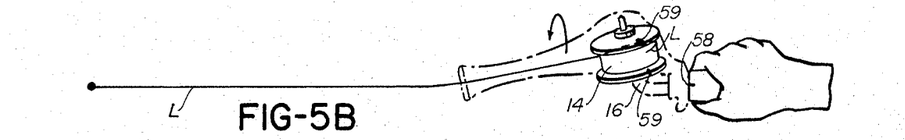
Figure 5C:
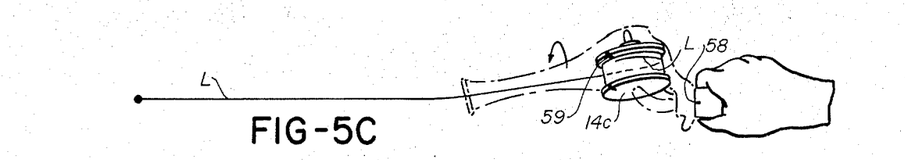
Figures 5D, 6, 7:
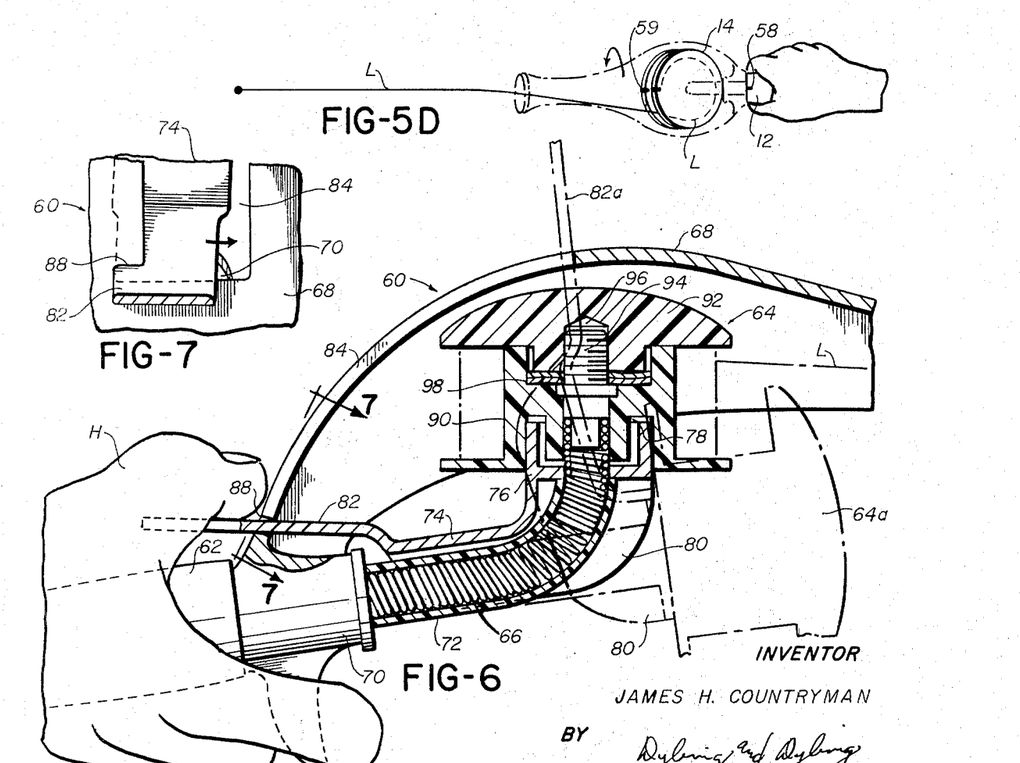
FIG. 6 is a side elevational view with parts in cross section of another embodiment of a reel in accordance with this invention shown gripped by the hand of the user.
FIG. 7 is a cross sectional view of the portion of the device of FIG. 5 as viewed in the direction of arrows 7—7 thereof.

With reference to FIG. 3 the spool 14 is rotated relative to the handle 12 in the direction of the arrows thereon, repeatedly passing through positions identified by the phantom lines 14c and 14d. The corresponding positions of the shell 18 and tang 50 are illustrated at 18c, 18d and 50c, 50d in FIG. 3. The position of the spool 14 in FIG. 5C corresponds to that illustrated at 14c in FIG. 3. FIG. 5B illustrates a position intermediate the full line position of FIG. 3 and the phantom line 14c position in FIG. 3. FIG. 5D illustrates the position of the spool after it is rotated through 180° which is a position intermediate the positions 14c and 14d in FIG. 3.

For purposes of illustration, in FIG. 5A a reference mark 58 has been placed on the handle 12 in alignment with indication marks 59 on the spool 14. In each of FIGS. 5A through 5D to line L is drawn as if it began in alignment with the indicator marks 59. It will be observed in FIGS. 5A through 5D that, although the spool 14 undergoes an apparent rotation, it only twirls or orbits about the axis of the handle 12, the indicator marks 59 being again aligned with the reference mark 58 after 180° rotation (from FIGS. 5A to 5D). Although the spool 14 does not rotate about its own axis, the line L is reeled in as a result of the orbital movement of the spool 14 by virtue of the relative movement of the spool 14 and the end of the line L. The coaction between the spool 14 and the line L during the reeling, orbital movement of the spool 14 is essentially the same that occurs when one twirls one of his fingers to coil or curl his hair in a spiral about the finger. FIGS. 5A through 5D show the end of the line L progressing from left to right to demonstrate that the length of the line beyond the end of the shell 18 is getting shorter because the line is being reeled in. The length of line reeled in for each 360° orbital rotation of the spool 14 will be equal to the circumference of the spool 14 on which the line is being spirally curled. After the line L is fully reeled in, the parts including the line L are back to the positions thereof illustrated in full lines in FIG. 2 and the line L may again be cast out by the slinging motion described above, no further resetting of the parts being necessary. The operation of the device 10 requires that the line L adjacent the spool 14 be reasonably taut. In practice it is found that the weight of a lure coupled with the resistance to the movement of the lure through the water is adequate to retain the line in a taut condition. The reeling in of the line can be stopped at any time so that it is possible to reel in the lure through any desired distance. During the reeling in of the line, the device 10 is preferably pointed directly along the longitudinal axis of the portion of the line just beyond the end of the shell 18. The line is reeled in toward the spool through the bore 26 at the end of the shell 18 which is made larger to minimize lateral movements of the line as it is being reeled in. The shell 18 is arcuate along its length so that it may, on the one hand, be rotatably mounted on the handle 12 and, on the other hand, the longitudinal axis of the handle 12 will extend through the bore 26. Here it may be noted that in FIGS. 5A through 5D the plate portion 28 with the small aperture 30 is not illustrated therein, such serving as an optional line guide.

It will be understood that flexible connectors other than the spring 16 could be employed in the practice of this invention. For example, universal joints or ball-and-socket joints designed to enable the spool 14 to orbit would be satisfactory. The spring 16 is desirable because it is self-biasing to the casting position illustrated at 16a in FIG. 2 with its axis straight and aligned with the longitudinal axis of the handle 12. Preferably the spring 16 has tightly wound coils because such a spring tends to be self-damping. That is, when the spool located at the position 14b is released, the spring 16 will cause the spool to be quickly moved to the position illustrated at 14a with a minimum of wobble or bounce. Another advantage accruing from the use of the spring 16 as the connector between the spool and the handle is that it has some "give" or elasticity. Accordingly, when a relatively large fish bites and pulls the line, the spring 16 may elastically become even more tightly wound permitting the fish to draw a few inches of line from the spool and no undue strain is placed on the line. Thus, the spring 16 may act as a type of substitute for the slender end of a conventional fishing pole which, when reeling a fish in, is bent to relieve strain on the line.

The rotatable mounting of the shell 18 on the handle 12 has utility other than merely providing the fixed point of engagement between the shell 18 and the pin 24. It may be observed that with the spool 14 located at the full line position of FIG. 2, the line could be reeled in by gripping the handle 12 as shown in FIG. 3, and spinning the shell 18 with the other hand, rather than by twirling the entire device 10. Normally when casting out, the fish hook W and the weight, bobbin, or other parts associated therewith, will be extended further from the end of the shell 18 than is illustrated in FIGS. 1 and 2 to provide increased leverage for long casts. The person using the device 10 may find that he prefers a particular extension of the line L past the shell 18 in preparation for casting. He can extend or retract the line a short distance by manually rotating the shell 18 while holding the handle 12 against rotation, or, alternatively, he could grip the shell 18 with one hand and rotate the handle 12 with the other. The line L would then be extended or retracted by rotation of the spool which is then operating in drum-wind fashion. Here the spring 16 acts as a flexible drive coupling which causes the spool 14 to rotate about its own axis.

The rotatably mounted shell 18 has another advantage. When the fisherman is awaiting a fish bite, he can grasp only the shell 18, leaving the handle 12 free to rotate. If a fish grabs the hook and begins to run with the line, the line will be pulled out because the spool 14 will rotate about its axis, such rotation also being imparted through the spring 16 to the handle 12. The fisherman can then, whenever he deems appropriate, create a drag on the rotation of the spool 14 by moving the palm of his hand into frictional engagement with the handle 12. Thus the fisherman can "play the fish" by intermittently increasing and decreasing the force which the fish must employ to dereel the line L.

FIGS. 6 and 7 disclose another embodiment, generally designated 60, of a fishing device in accordance with this invention. The device 60 includes a handle 62, a spool generally designated 64, a spring 66 and a rotatable shell 68 mounted as by a tubular sleeve 70 on the end of the handle 62. As in the case of the spring 16, the spring 66 may optionally be coated or covered by a sheath 72. The parts 62, 64, 66, 68, 70 and 72 perform functions identical to the corresponding parts 12, 14, 16, 18, 48 and 54 described above in connection with FIGS. 1-4. In the embodiment of FIGS. 6 and 7, however, the spool 64 is not directly engaged by the fisherman. Rather, an operating lever 74 is provided having at one end an annular cup-shaped bearing portion 76 extending into an annular slot 78 in the base of the spool 64 and engaging the outer wall of the slot 78. The middle portion of the operating lever 74 is generally U-shaped in cross section with the legs, such as that designated 80, of the "U" straddling the spring 66 to guide or confine the spring 66 in its movements. The opposite end of the operating lever 74 consists of a tongue 82 which projects through an elongate longitudinally extending slot 84 in the shell 68. The body of the shell 68 adjacent the lower end of the slot 84 is notched at 88 to provide a type of lock for the tongue portion 82. In preparation for the reeling in of the line, the side of the tongue 82 is inserted into the notch 88 as illustrated in FIG. 7. This causes the spool 64 to be fixed in relation to the handle 62 with its axis intersecting the longitudinal axis of the handle 62 as shown in full lines in FIG. 6. The line L can be reeled in by a twirling motion as described above. That is, the handle 62 only would be gripped and the spool 64 and shell 68 caused to orbit about the axis of the handle 62. When it is by to cast the line, the hand H is positioned as illustrated in FIG. 6 with the thumb engaging the tongue portion 82, the tongue portion 82 being moved in the direction of the arrow in FIG. 7 to release it from engagement within the notch 88. Thereafter the device 60 is swung through an arc and, at the desired moment, the thumb is released from the tongue 82 whereupon the spring 66 causes the spool 64 to move to the phantom line position designated 64a with the tongue 82 moving to the position designated 82a at the upper end of the slot 84. The line is accordingly slung or cast out in the same manner described above in relation to the device 10. FIG. 6 also shows in phantom lines the translated position of one of the guide legs 80.

As apparent, the provision of the operating lever 74 avoids the necessity of one having to reach his thumb into engagement with the spool. Also since the tongue portion 82 of the operating lever 74 establishes the fixed relationship between the spool 64 and the shell 68, the aforedescribed pin 24 projecting above the spool is not required. Although, if care is exercised, the presence of the pin 24 is not objectionable, those unfamiliar with the use of the device 10 may occasionally find that the line L wraps about the pin 24. Such, of course, could not happen in the device 60. Nevertheless, the device 10 shown in FIGS. 1–4 is presently preferred both because its use is satisfactory and because it is inherently cheaper than the device 60 since the device 60 requires the addition of, and accordingly the expense of, the operating lever 74 and a good bearing between the operating lever 74 and the spool 64.

In FIG. 6 the spool 64 is shown in two parts consisting of a body portion 90 and a cap 92. The body portion 90 has a central bore receiving a pin 94 to which the end of the spring 66 is attached. The upper end of the pin 94 is threaded and engaged by internal threads in a hole 96 located centrally of the base of the cap 92. The body portion 90 is rotatably mounted on the bearing portion 76 of the operating lever 74 and is thus free to rotate about its axis. Located between the cap 92 and the body portion 90 and in surrounding relation to the pin 94 are a pair of clutch plates 98. As those familiar with the art will understand, two or more such clutch plates 98 frictionally engaged between the cap 92 and the body portion 90 may be used to create a drag or resistance to rotation of the body portion 90. The force required to overcome the drag can be varied or predetermined by how tightly the cap 92 is threaded onto the pin 94.

Figures 8, 9:
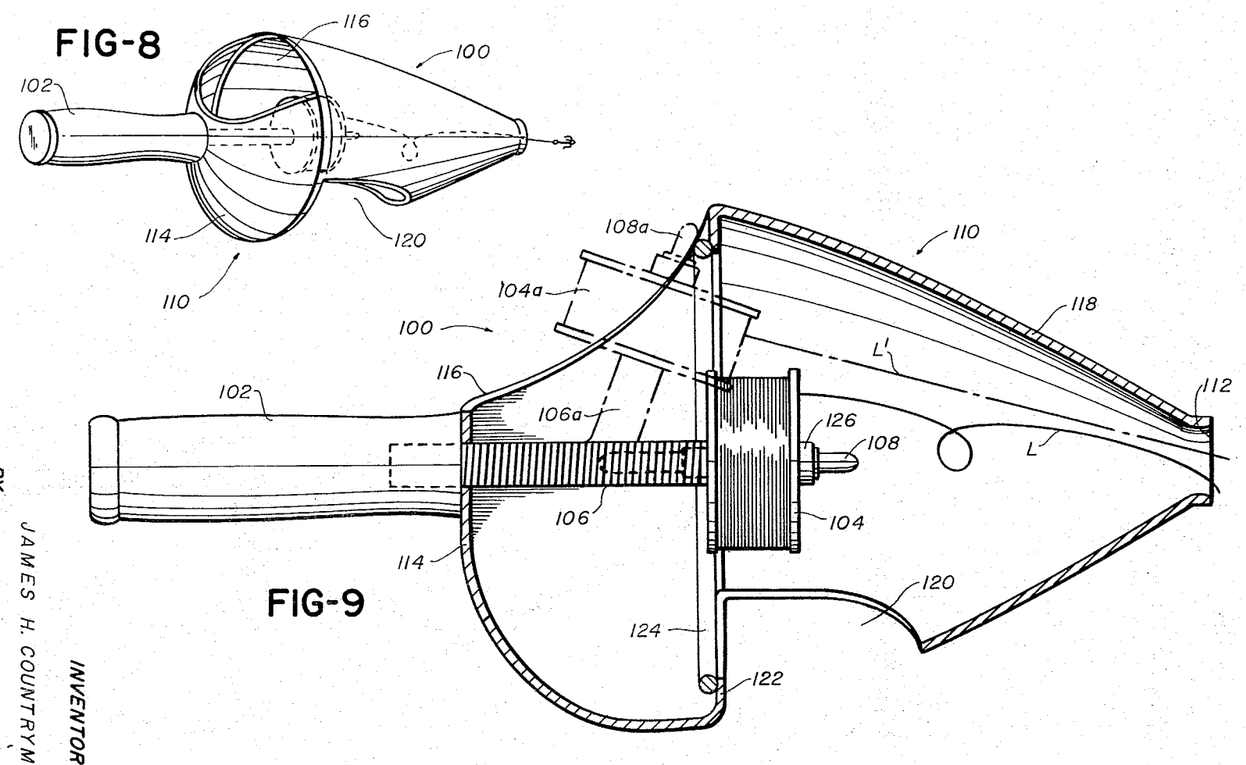
FIG. 8 is a perspective view of still another embodiment of this invention.
FIG. 9 is a side elevational view with parts in cross section of the embodiment of FIG. 8.

Constructions other than those described above can readily be imagined. Perhaps in its simplest form a reel device (not shown) could consist of a coil spring lodged in the end of a handle in a spool on the free end of the coil spring. When reeling in line with such a device, one could rely upon the centrifugal forces exerted upon the spool to maintain it in its orbital path. That is, the spool need not necessarily be releasably affixed to the shell when reeling line in. This form of the device would, however, require considerable skill to use and it is believed that the most practical forms of the invention would include some sort of guide for the spool in the reeling in position. FIGS. 8 and 9 show another simple embodiment of a device made in accordance with this invention.

In FIGS. 8 and 9 the embodiment of the fishing device is generally designated 100. The device 100 includes a generally elongate cylindrical handle 102, a spool 104, and a spring 106 interconnecting the handle 102 and the spool 104. In this embodiment, one end of the spring 106 may be lodged in and thereby fixed to the handle 102 and the other end of the spring is affixed to the spool 104 in any suitable fashion such as by the press fitting of the spring end onto an enlarged diameter portion of a pin 108 extending axially of the spool 104. For reasons already stated, the spring 106 is preferably a tightly wound spiral coil spring having a relaxed condition which is shown in full lines in FIG. 9 with its longitudinal axis straight and aligned with the longitudinal axis of the handle 102 and the center axis of the spool 104.

Affixed to or integral with the handle 102 is a shell or cowling member generally designated 110 that acts as a housing for the spool 104 and which at its free end is formed with an opening 112 that serves as a line guide. The shell or cowling member 110 has a first end portion 114 adjacent the handle 102 which is generally bowl-shaped and which has an access opening 116 therein so that one may, while grasping the handle 102, place the thumb on the spool 104 when it is in the position illustrated by phantom lines 104a in preparation for the casting out of the line L. The shell or cowling member 110 has a second bowl-shaped portion designated 118, the wider end of which is integral with or affixed to the wider end of the first bowl-shaped portion 114 and the narrow end of which terminates in the aforementioned opening 112. The portion 118 has an access opening 120 therein through which one may insert his hand to pivot the spool 104 from the casting position shown in full lines in FIG. 9 to the reeling position illustrated by the phantom lines 104a. At the point of joinder of its two bowl-shaped portions 114 and 118, the member 110 is provided with an annular radially inwardly directed flange 122 which has on its face closest to the handle 102 an annular bead 124 that serves as a raceway for the end of the pin 108 when it is positioned as indicated at 108a in the reeling in position of the spool 104.

The operation of the device 100 shown in FIGS. 8 and 9 is believed apparent from the foregoing description. Very briefly the line L is cast out in spin cast fashion in precisely the same manner as the line L is cast out in the two previously described embodiments. That is, in preparation for casting, one would grip the handle 102, place his thumb on top of the spool 104 which is located at the 104a position, depress the spool to a position intermediate the two positions thereof shown in FIG. 9, and swing the device 100 through an arc to cause the line to be cast when the thumb is released from the spool 104. After the line is cast out, the spool 104 is moved back to the position shown by phantom lines 104a by bending the spring 106 as illustrated at 106a. The portion of the line L immediately adjacent the spool 104 is then located as shown by broken lines L' whereupon it is approximately tangential to the line receiving portion of the spool 104. The line can then be reeled in by twirling the device 100 beginning with a cranking motion which causes the spool 104 at the position 104a to orbit about the longitudinal axis of the handle 102 with the pin 108 located at position 108a sliding along the raceway formed by the bead 124. Although the device 100 does not have all of the advantages of the previously described embodiments, it does have the advantage of simplicity, especially when it is considered that it would be possible to mold the handle 102 and the shell 110 with the bead 124 as one piece from a suitable plastic, and beyond that the only parts that the device 100 includes are the spring 106, the pin 108, the spool 104 and a suitable fastener such as the nut 126 for holding the spool 104 on the pin 108.

Although the presently preferred embodiments of this invention have been described, it will be understood that various changes may be made within the scope of the appended claims.

Having thus described my invention, I claim:

1. In a line reeling device, spool supporting means, an orbiting spool having a center axis which intersects and rotates about a predetermined axis passing through said supporting means as said spool orbits, and coupling means connecting said spool to said supporting means substantially preventing rotation of said spool about its said center axis as it orbits.

2. The device of claim 1 wherein said coupling means comprises a spirally coiled spring connected at its opposite ends respectively to said spool and said supporting means, the end of said spring connected to said spool being coaxial with said center axis.

3. The device of claim 2 wherein said spring has a normal relaxed condition coaxial with said predetermined axis.

4. The device of claim 1 further including means mounted on said spool supporting means for rotation about said predetermined axis for releasably holding said spool with the axis of said spool intersecting said predetermined axis.

5. The device of claim 4 wherein said last mentioned means has line guide portions through which said line extends.

6. The device of claim 1 further including means mounted on said spool supporting means releasably holding said spool with said center axis intersecting said predetermined axis.

7. The device of claim 6 further including a pin projecting from said spool, and wherein said means releasably holding said spool includes a raceway along which said pin moves during orbital movement of said spool.

8. A fishing device comprising a handle, a spool, means for orienting said spool for orbital movement about a predetermined axis passing through said handle, and coupling means connecting said spool to said handle substantially preventing rotation of said spool as it orbits.

9. The device of claim 8 wherein said coupling means comprises a spirally coiled spring connected at one of its ends to and coaxially with said spool and at its other end to and coaxially with said handle.

10. The device of claim 9 wherein said spring has a normal relaxed condition coaxial with said axis of said handle.

11. The device of claim 8 further including means releasably retaining said spool with its axis intersecting said predetermined axis while said spool orbits.

12. The device of claim 11 wherein said last mentioned means is mounted on said spool for rotation about said axis of said handle.

13. The device of claim 12 wherein said last mentioned means further includes a manually operable lever upon which said spool is mounted, said lever member having a portion projecting adjacent said handle for engagement by the hand of the one using the device.

14. The device of claim 12 wherein said last mentioned means comprises a shell member having a notch, and wherein a pin is provided projecting coaxially through and beyond the free end of said spool, said notch being adapted for releasably receiving said pin.

15. The device of claim 14 wherein said shell member is provided with at least one line guide portion for guiding line to and from said spool.

16. The device of claim 14 wherein said coupling means comprises a spirally coiled spring connected at one of its ends to and coaxially with said spool and at its other end to and coaxially with said handle.

17. The device of claim 16 wherein said pin is received in said one of said ends of said spring and affixed to said spring, said spool being connected to said pin.

18. The device of claim 11 wherein said last mentioned means includes means connected to said handle including an annular raceway surrounding said predetermined axis along which a part fixed in relation to said spool moves during orbital movement of said spool.

19. The device of claim 18 wherein said part comprises a pin projecting axially through said spool.

20. In a line reeling device of the type having a spool from the end of which line may be dereeled, the improvement comprising a support for said spool and coupling means connecting said spool to said support permitting said spool to orbit about a predetermined axis passing through said support and substantially preventing rotation of said spool relative to said support as it orbits whereby twists imparted to the line as it is cast off the end of the spool are removed as it is reeled back onto the spool.

* * * * *

UNITED STATES PATENT OFFICE
CERTIFICATE OF CORRECTION

Patent No. 3,823,502     Dated July 16, 1974

Inventor(s) James H. Countryman

It is certified that error appears in the above-identified patent and that said Letters Patent are hereby corrected as shown below:

Column 3, line 47, remove the period after "spool".
Column 4, line 8, insert ---and--- after "32".
Column 6, line 17, change "to" to ---the---.
Column 8, line 25, change "by" to ---desired---.
Column 11, line 19, change "said axis of said handle" to
    ---said predetermined axis---.

Signed and sealed this 12th day of November 1974.

(SEAL)
Attest:

McCOY M. GIBSON JR.           C. MARSHALL DANN
Attesting Officer             Commissioner of Patents